US011834798B2

(12) United States Patent
Johnson et al.

(10) Patent No.: US 11,834,798 B2
(45) Date of Patent: Dec. 5, 2023

(54) SYSTEM FOR TRANSFERRING TORQUE FROM DRIVESHAFTS TO MILLING DRUMS

(71) Applicant: Caterpillar Paving Products Inc., Brooklyn Park, MN (US)

(72) Inventors: Nicholas Bernard Johnson, Dayton, MN (US); Craig Thomas Hedstrom, Mounds View, MN (US); Ryan Steve Hutar, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 22 days.

(21) Appl. No.: 17/450,080

(22) Filed: Oct. 6, 2021

(65) Prior Publication Data

US 2023/0107382 A1  Apr. 6, 2023

(51) Int. Cl.
| | |
|---|---|
| *E01C 23/088* | (2006.01) |
| *F16D 1/06* | (2006.01) |
| *E01C 23/12* | (2006.01) |
| *F16D 1/10* | (2006.01) |

(52) U.S. Cl.
CPC .......... *E01C 23/088* (2013.01); *E01C 23/127* (2013.01); *F16D 1/06* (2013.01); *F16D 2001/062* (2013.01); *F16D 2001/102* (2013.01); *F16D 2001/103* (2013.01)

(58) Field of Classification Search
CPC ...... E01C 23/088; E01C 23/127; F16D 1/076; F16D 1/06; F16D 2001/062; F16D 2001/102; F16D 2001/103
See application file for complete search history.

(56) References Cited

U.S. PATENT DOCUMENTS

| | | | |
|---|---|---|---|
| 4,720,207 A | * | 1/1988 | Salani ................... B28D 1/186 404/90 |
| 6,877,818 B1 | | 4/2005 | Gaertner et al. |
| 7,475,947 B2 | | 1/2009 | LeBegue |
| 7,901,011 B2 | | 3/2011 | Holl et al. |
| 8,474,919 B2 | | 7/2013 | Cipriani et al. |
| 9,234,320 B2 | * | 1/2016 | Abresch ............... E01C 23/127 |
| 9,903,201 B2 | | 2/2018 | Mitterndorfer |

(Continued)

FOREIGN PATENT DOCUMENTS

| | | |
|---|---|---|
| DE | 102016124092 A1 | 6/2018 |
| DE | 102020105391 B3 | 3/2021 |

(Continued)

OTHER PUBLICATIONS

Office Action from German patent appln. No. 10 2022 125 550.6 (dated Jun. 9, 2023, 12 pgs) (D1 is a counterpart to U.S. Pat. No. 10,724,188B2, already of record).

*Primary Examiner* — Janine M Kreck
(74) *Attorney, Agent, or Firm* — Bookoff McAndrews, PLLC

(57) ABSTRACT

A system for transferring torque from a driveshaft to a milling drum mountable on the driveshaft. The system includes a first coupler removably coupled to the driveshaft to co-rotate with the driveshaft. The first coupler defines an engagement surface. Also, the system includes a second coupler removably coupled to the milling drum. The second coupler defines a mating surface engageable with the engagement surface of the first coupler to engage the second coupler to the first coupler and transfer torque from the driveshaft to the milling drum.

20 Claims, 6 Drawing Sheets

(56) References Cited

U.S. PATENT DOCUMENTS

| | | | |
|---|---|---|---|
| 10,724,188 B2 * | 7/2020 | Berning | ............... E01C 23/088 |
| 2020/0407927 A1 | 12/2020 | Berning et al. | |
| 2021/0017721 A1 | 1/2021 | Mannebach et al. | |
| 2021/0108684 A1 | 4/2021 | Hedstrom et al. | |

FOREIGN PATENT DOCUMENTS

| | | | |
|---|---|---|---|
| EP | 2597205 B1 | 4/2014 |
| EP | 2350391 B1 | 1/2018 |
| EP | 3406797 A1 | 11/2018 |
| EP | 3406796 B1 | 10/2019 |
| EP | 3406798 B1 | 11/2019 |

* cited by examiner

SYSTEM FOR TRANSFERRING TORQUE FROM DRIVESHAFTS TO MILLING DRUMS

TECHNICAL FIELD

The present disclosure relates to a milling machine having a driveshaft and a milling drum driven by the driveshaft, and more particularly, to a system for transferring torque from the driveshaft to the milling drum.

BACKGROUND

Milling machines, such as cold planers (also known as road mills or profilers), are generally used to process (e.g., scarify, remove, reclaim, etc.) material from ground surfaces (e.g., a roadway, parking lots, etc.). A milling machine typically includes a frame and a milling assembly supported by the frame. The milling assembly includes a cutting drum or a milling drum having multiple cutting tools disposed thereon. The milling drum is spun by a suitable mechanism and is then lowered to break up and pulverize one or more layers of materials from the ground surface.

Depending upon a nature of application, differently finished surfaces may need to be attained over a ground surface by way of a milling operation. To meet such differently finished surfaces over a ground surface, it is common for different milling drums (e.g., having varying specifications and/or configurations) to be interchangeably installed or mounted onto the milling machines. However, changing a milling drum is a time and labor-intensive task, and, in most cases, a milling machine and/or the site operators suffer significant downtime during a milling drum changeout. This in turn leads to lost man hours and reduced worksite productivity.

European Patent No. 3406796 discloses an earth working machine. The earth working machine includes a machine body having a machine frame, a drive configuration rotationally drivable relative to the machine frame, and a milling drum releasably connected in torque-transferring fashion to the drive configuration. The milling drum is connected to the drive configuration, via a support cone at a drive axial end of the milling drum and via a connecting flange at a retention axial end of the milling drum.

SUMMARY OF THE INVENTION

In one aspect, the disclosure relates to a system for transferring torque from a driveshaft to a milling drum mountable on the driveshaft. The system includes a first coupler removably coupled to the driveshaft to co-rotate with the driveshaft. The first coupler defines an engagement surface. Also, the system includes a second coupler removably coupled to the milling drum. The second coupler defines a mating surface engageable with the engagement surface of the first coupler to engage the second coupler to the first coupler and transfer torque from the driveshaft to the milling drum.

In another aspect, the disclosure is directed to a milling assembly for a milling machine. The milling assembly includes a driveshaft and a milling drum mountable on the driveshaft. Also, the milling assembly includes a system for transferring torque from the driveshaft to the milling drum. The system includes a first coupler removably coupled to the driveshaft to co-rotate with the driveshaft. The first coupler defines an engagement surface. Also, the system includes a second coupler removably coupled to the milling drum. The second coupler defines a mating surface engageable with the engagement surface of the first coupler to engage the second coupler to the first coupler and transfer torque from the driveshaft to the milling drum.

In yet another aspect, the disclosure is related to a milling machine. The milling machine includes a frame and a milling assembly supported by the frame. The milling assembly includes a driveshaft and a milling drum mountable on the driveshaft. Also, the milling assembly includes a system for transferring torque from the driveshaft to the milling drum. The system includes a first coupler removably coupled to the driveshaft to co-rotate with the driveshaft. The first coupler defines an engagement surface. Also, the system includes a second coupler removably coupled to the milling drum. The second coupler defines a mating surface engageable with the engagement surface of the first coupler to engage the second coupler to the first coupler and transfer torque from the driveshaft to the milling drum.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
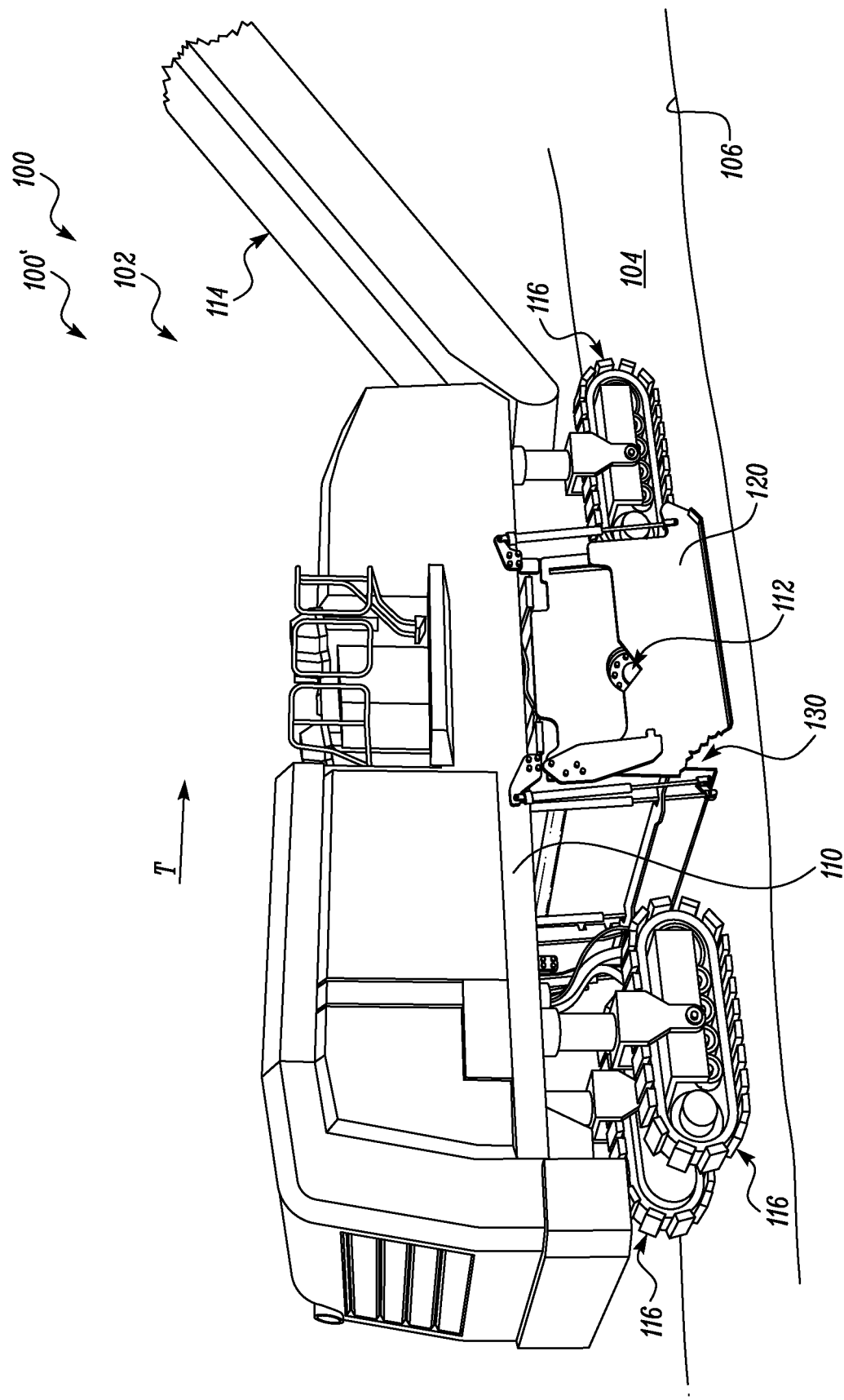
FIG. 1 is a perspective view of an exemplary machine having a milling assembly, in accordance with an embodiment of the present disclosure.

Referring to FIG. 1, a machine 100 is shown. The machine 100 may include a roadway/pavement profiler, a roadway planer, or a milling machine 100'. As an example, the milling machine 100' includes a cold planer 102. The machine 100 may be used to perform a milling operation to modify a ground surface 104. For example, the milling operation may mean or include scarifying, removing, mixing, and/or reclaiming material, from the ground surface 104. The ground surface 104 may be a worn-out surface of a roadway 106, formed from one or more of asphalt, bitumen, concrete, and/or other road surface materials. Said ground surface 104 may be milled and removed by way of the aforesaid milling operation for the laying of a new surface.

The machine 100 may include a frame 110, a milling assembly 112, a conveyor 114, and a set of traction devices 116 to support and propel the machine 100 over an expanse of the roadway 106. The traction devices 116 may include tracks and/or wheels and/or a combination thereof. Exemplarily, the machine 100 may include four traction devices 116 (one at each corner of the frame 110 of the machine 100), although lesser or higher number of traction devices 116 may be contemplated. The traction devices 116 may be adjustably supported on the frame 110 and may be varied independently with respect to the frame 110, such that a distance (e.g., a height) of the frame 110 may be varied relative to the traction devices 116, allowing the frame 110 to acquire a desired orientation with respect to the ground surface 104 (or the roadway 106).

Figure 2:
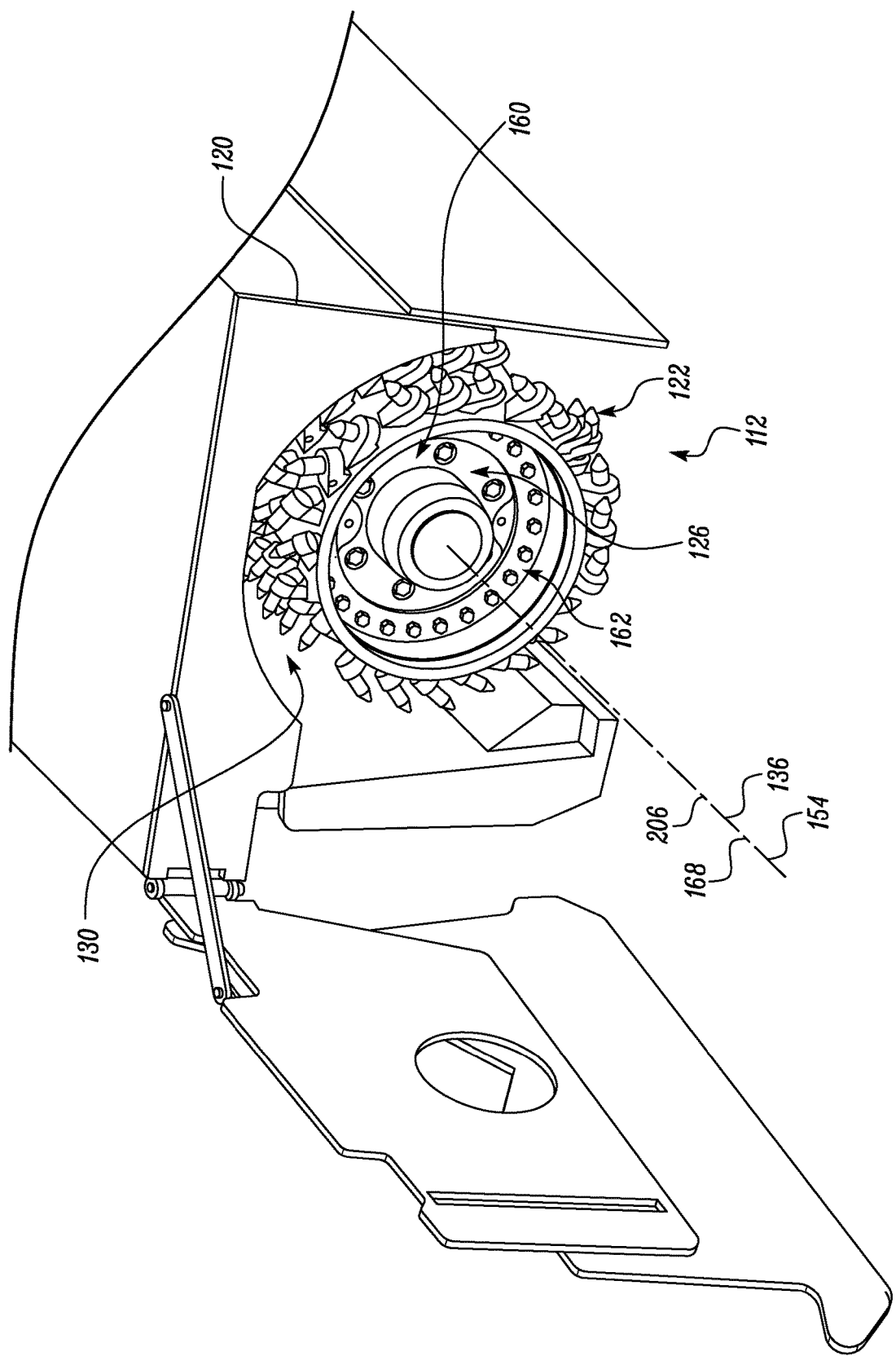
FIG. 2 is a perspective view of the milling assembly, including a driveshaft, a milling drum mountable on the driveshaft, and a system for transferring torque from the driveshaft to the milling drum, with some elements removed for clarity, in accordance with an embodiment of the present disclosure.
Figure 3:
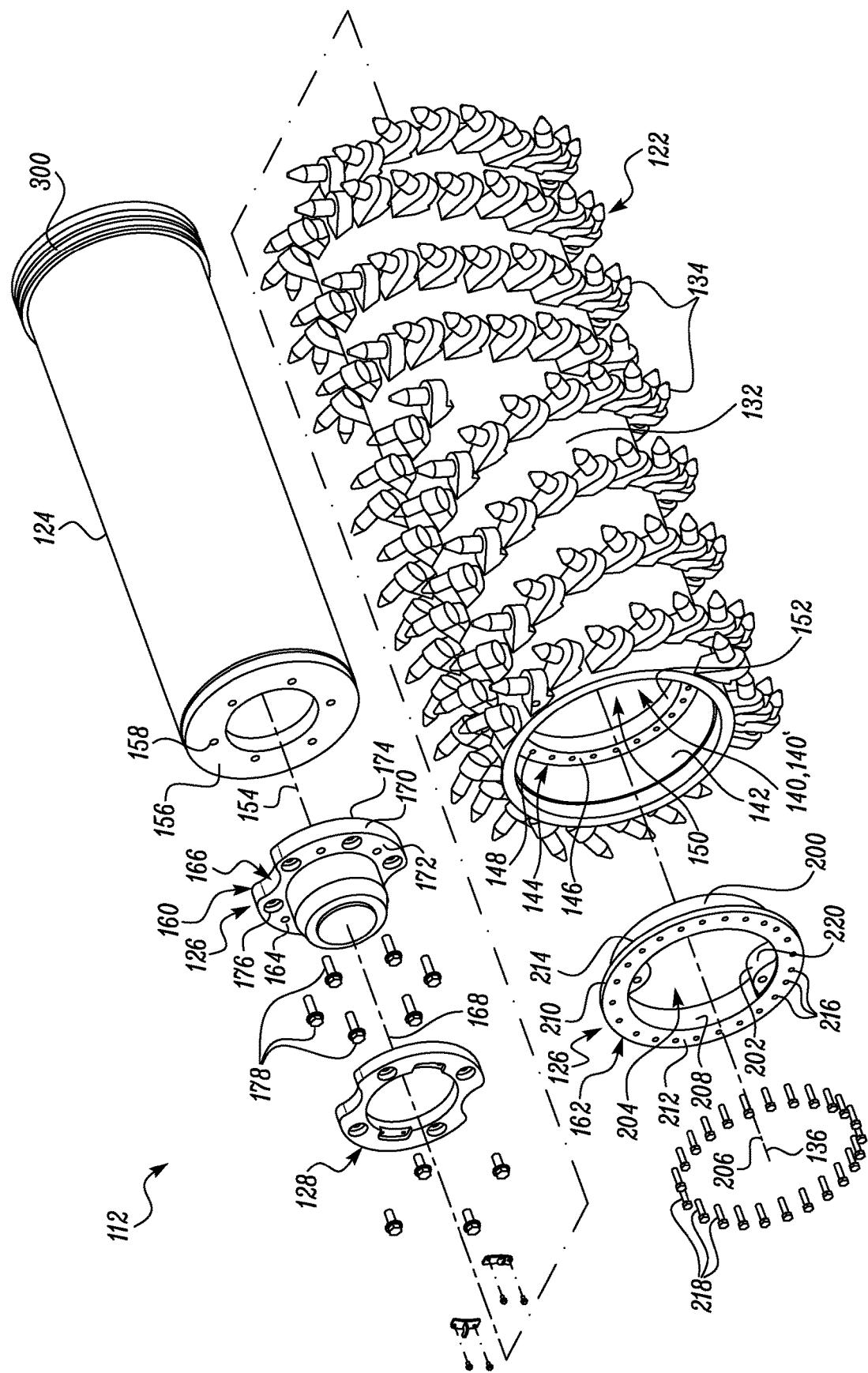
FIG. 3 is an exploded view of the milling assembly, in accordance with an embodiment of the present disclosure.

Referring to FIGS. 1, 2, and 3, the milling assembly 112 may be supported by the frame 110 and may be configured to facilitate the milling operation. The milling assembly 112 may include a milling chamber 120, a milling drum 122, a driveshaft 124, a system 126, and a retention member 128 (please see FIGS. 2 and 3). During the milling operations, the ground surface 104 may be milled by the milling assembly 112 as the machine 100 moves over the ground surface 104 (e.g., see direction, T) (FIG. 1). The milling operation facilitates disintegration of the ground surface 104 to result in milled materials and thus a milled roadway surface. Said milled materials resulting from the milling operation may be transferred to the conveyor 114. The conveyor 114 may in turn convey the milled materials into a dump body of a transport vehicle (e.g., a dump truck) (not shown) that may move ahead of the machine 100.

The milling chamber 120 may be supported on and/or be suspended under the frame 110 of the machine 100 enabling the milling assembly 112, generally as a whole, to acquire a position under the frame 110 of the machine 100, as shown. The milling chamber 120 may define an enclosure 130 and may be applied to confine and restrict a spread of disintegrated particles and the milled materials produced during the milling operation within the enclosure 130 (or a boundary) defined by the enclosure 130.

The milling drum 122 may be housed within the enclosure 130 defined by the milling chamber 120. The milling drum 122 may be applied to modify (e.g., to engage and mill) the ground surface 104 during the milling operations so as to obtain the milled materials and thus the milled roadway surface. The milling drum 122 may include a drum portion 132 (e.g., a cylindrical drum portion) and multiple cutter tools 134 arranged over and around the drum portion 132 (please see FIG. 3). During a milling operation, the milling drum 122 may be powered (e.g., electrically or hydraulically) to rotate (e.g., about a drum axis 136). While rotating, the milling drum 122 may be lowered to contact the ground surface 104. In so doing, the milling drum 122 may grind and scrape off a top of the ground surface 104 or one or more layers of the ground surface 104 that the milling drum 122 may come in contact with. In so doing, a top of the ground surface 104 or one or more top layers of the roadway 106 may disintegrate into rubble, dust, and debris, and may result in the formation of the milled materials for a transfer to the conveyor 114, helping also in turn attain the milled roadway surface.

The milling drum 122 may include a hollow space 140 (e.g., a cylindrical hollow space 140') defining an internal surface 142 within the drum portion 132. The internal surface 142 may be defined around the drum axis 136, and, although not limited, the internal surface 142 may be cylindrical in profile. The internal surface 142 may include a flange portion 144 structured and arranged thereon within the hollow space 140. In the present embodiment, the flange portion 144 may be integrally formed with the drum portion 132 and be in a fixed and/or a merged relationship with the internal surface 142. The flange portion 144 may define a flange face 146 having a plurality of mounting-holes 148, an opening 150, and an inner circumferential surface 152 that extends around the opening 150, as shown.

The driveshaft 124 may be powered by a drive source (e.g., an electrical drive source or a hydraulic drive source) (not shown) so as to be driven (e.g., rotatably driven) to in turn drive the milling drum 122. The driveshaft 124 may define a drive axis 154 and an axial end 156 with a plurality of mounting bores 158 (e.g., there are six mounting bores 158 provided at the axial end 156, but only one mounting bore 158 is marked in FIG. 3). Although not limited, the driveshaft 124 may include a cylindrical structure, and may be at least partly received into the hollow space 140 defined by the milling drum 122 to allow the milling drum 122 to be mounted onto the driveshaft 124.

Further, the driveshaft 124 may be engageable with the milling drum 122 such that a drive (e.g., a rotary drive) of the driveshaft 124 may result in a drive (e.g., a rotary drive) of the milling drum 122 and torque may be transferred from the driveshaft 124 to the milling drum 122. To attain such torque transfer between the driveshaft 124 and the milling drum 122, in one or more aspects of the present disclosure, the system 126 is disclosed. The system 126 facilitates said transfer of torque from the driveshaft 124 to the milling drum 122. The system 126 includes a first coupler 160 and a second coupler 162.

Figure 4:
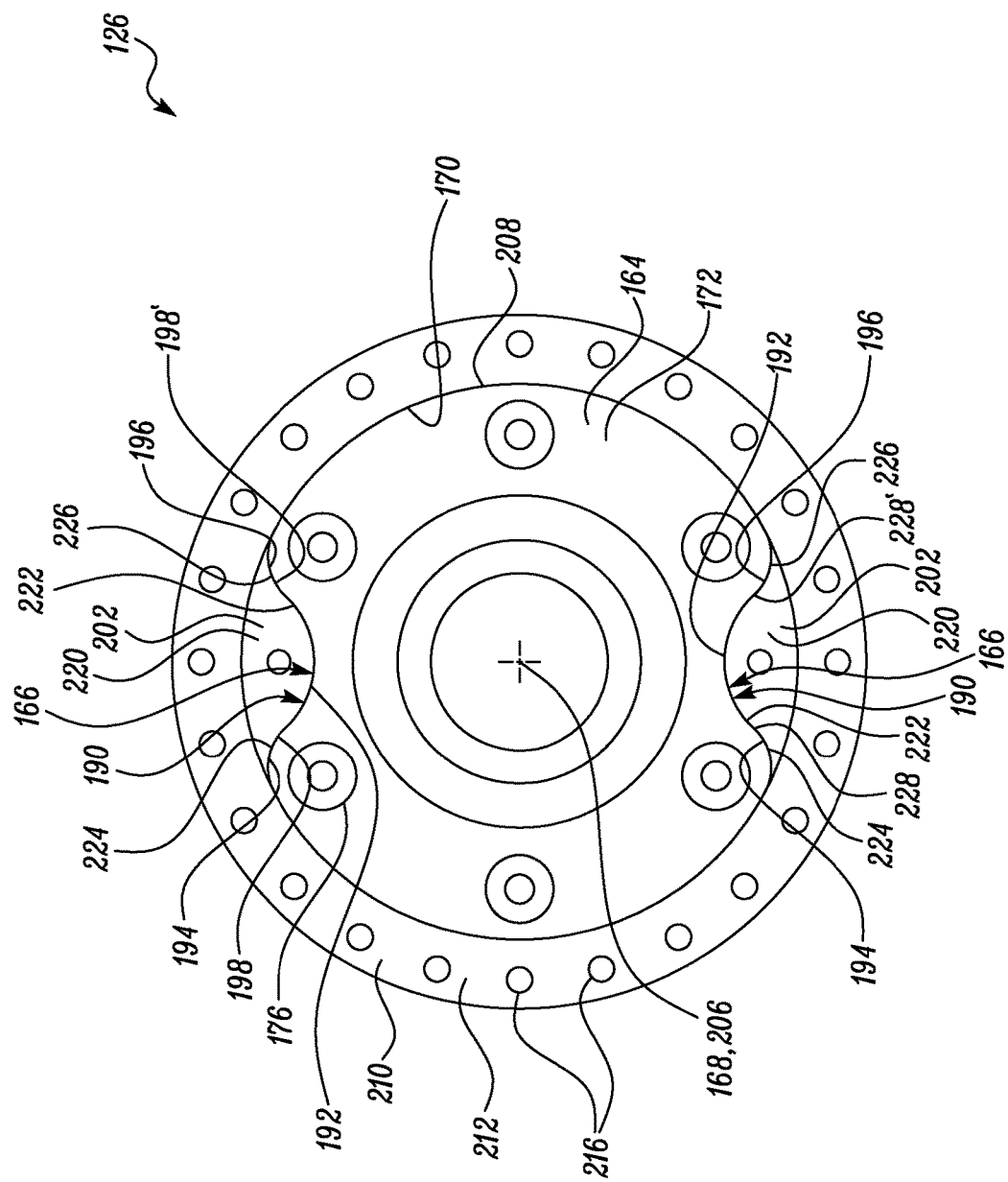
FIG. 4 is a front view of the system, in accordance with an embodiment of the present disclosure.

Referring to FIGS. 2, 3, and 4, the first coupler 160 may include a disc shaped body 164 and an engagement surface 166. The disc shaped body 164 may define a first axis 168 and an outer periphery 170 extending around the first axis 168, along with axial end surfaces, such as a first end surface 172 and a second end surface 174. The first end surface 172 and the second end surface 174 may be disposed opposite to each other and may be defined in planes that are parallel to each other.

Further, the disc shaped body 164 (or the first coupler 160) may include a plurality of through-bores 176 (e.g., there are six through-bores 176, but only one through-bore 176 is marked in FIG. 3). The through-bores 176 may extend from the first end surface 172 to the second end surface 174 and may be equidistantly spaced and/or rotationally arrayed around the first axis 168. The through-bores 176 may correspondingly receive fasteners (e.g., first fasteners 178) (only a few first fasteners 178 are marked in FIG. 3) therethrough to enable the first coupler 160 (or the disc shaped body 164) to be removably coupled to the axial end 156 of the driveshaft 124. As an example, the first fasteners 178 are six in number so as to be correspondingly received through the through-bores 176 and mounting bores 158. Higher or lower number of first fasteners 178 (and correspondingly through-bores 176 and mounting bores 158) may be contemplated.

In an assembly of the first coupler 160 to the driveshaft 124, the second end surface 174 of the first coupler 160 may be abutted against the axial end 156 of the driveshaft 124 such that the through-bores 176 are aligned with their corresponding mounting bores 158. Further, in the assembly of the first coupler 160 to the driveshaft 124, the first fasteners 178 may be received within the corresponding through-bores 176 and the mounting bores 158, and may be fastened or bolted to couple the first coupler 160 with the driveshaft 124 (or to the axial end 156). In that manner, the first coupler 160 is removably coupled with the axial end 156 of the driveshaft 124. Moreover, in the assembly of the first coupler 160 to the driveshaft 124, the first axis 168 may coincide (or be co-axially aligned) with the drive axis 154 of the driveshaft 124. Said coupling of the first coupler 160 with the driveshaft 124 enables the first coupler 160 to co-rotate with the driveshaft 124.

The engagement surface 166 may be defined by one or more concave portions 190 (please see FIG. 4). Each concave portion 190 may extend from the outer periphery 170 into the disc shaped body 164 of the first coupler 160. As an example, each concave portion 190 may define an arcuate portion 192, a first fillet portion 194, and a second fillet portion 196. The first fillet portion 194 and the second fillet portion 196 may be portions that may curve away from the outer periphery 170 so as to extend inwards into the disc shaped body 164. The arcuate portion 192 may extend between the first fillet portion 194 and the second fillet portion 196, and may extend further inwards into the disc shaped body 164 to impart a U-shaped profile to the engagement surface 166. Together, the first fillet portion 194, the second fillet portion 196, and the arcuate portion 192, may be continuous and may also smoothly transition into the disc shaped body 164 with respect to the outer periphery 170. As multiple concave portions may be contemplated, said multiple concave portions 190 may be arrayed around the first axis 168. In the present embodiment, two concave portions 190 are diametrically oppositely defined at the outer periphery 170 of the first coupler 160.

The second coupler 162 includes an annular body 200 and a mating surface 202. The annular body 200 may define an aperture 204, a second axis 206 passing through the aperture 204, and an inner periphery 208 extending around the aperture 204 and the second axis 206. The inner periphery 208 may match (e.g., in shape and size) with the outer periphery 170 of the first coupler 160 and thus, the inner periphery 208 of the second coupler 162 may be seated over and around the outer periphery 170 of the first coupler 160. Further, the annular body 200 may define a stepped flange portion 210 having an outer diameter larger than an outer diameter of the annular body 200, as shown. The stepped flange portion 210 may define a first side surface 212 and a second side surface 214. The first side surface 212 and the second side surface 214 may be disposed opposite to each other and may be defined in planes that are parallel to each other.

Moreover, the stepped flange portion 210 (or the second coupler 162) may include a plurality of through-holes 216 (e.g., there are twenty-four through-holes 216, but only few through-holes 216 are marked in FIGS. 3 and 4). The through-holes 216 may extend from the first side surface 212 to the second side surface 214 and may be equidistantly spaced and/or rotationally arrayed around the second axis 206. The through-holes 216 may correspondingly receive fasteners (e.g., second fasteners 218) (only a few second fasteners 218 are marked in FIG. 3) therethrough to enable the second coupler 162 to be removably coupled to the internal surface 142 (e.g., to the flange portion 144) of the milling drum 122. As an example, the second fasteners 218 are twenty-four in number so as to be correspondingly received through the through-holes 216 and mounting-holes 148. Higher or lower number of second fasteners (and correspondingly through-holes 216 and mounting-holes 148) may be contemplated.

In an assembly of the second coupler 162 to the milling drum 122, the second side surface 214 of the second coupler 162 may be abutted against the flange face 146 of the flange portion 144 (or the internal surface 142) of the milling drum 122 such that the through-holes 216 are aligned with their corresponding mounting-holes 148 (present on the flange face 146). Further, in the assembly of the second coupler 162 to the milling drum 122, the second fasteners 218 are received within the corresponding through-holes 216 and mounting-holes 148, and are fastened or bolted to couple the second coupler 162 with the milling drum 122. In that manner, the second coupler 162 is removably coupled with the internal surface 142 of the milling drum 122. Moreover, in the assembly of the second coupler 162 to the milling drum 122, the second axis 206 may coincide (or be co-axially aligned) with the drum axis 136 of the milling drum 122.

The mating surface 202 may be defined by one or more protuberances or convex portions 220. Each convex portion 220 may extend from the inner periphery 208 into the aperture 204. Since in an assembly of the milling drum 122 with the driveshaft 124, the mating surface 202 of the second coupler 162 and the engagement surface 166 of the milling drum 122 may be in engagement with each other, it may be possible for the mating surface 202 to include a profile that matches (i.e., in shape and size) with a profile of the engagement surface 166. Accordingly, each convex portion 220 may define a curved portion 222, a third fillet portion 224, and a fourth fillet portion 226 (please see FIG. 4). The third fillet portion 224 and the fourth fillet portion 226 may be portions that may curve away from the inner periphery 208 so as to extend inwards into the aperture 204. The curved portion 222 may extend between the third fillet portion 224 and the fourth fillet portion 226, and may extend further inwards into the aperture 204 to impart a U-shaped profile to the mating surface 202. Together, the third fillet portion 224, the fourth fillet portion 226, and the curved portion 222, may be continuous and may also smoothly transition into the aperture 204 with respect to the inner periphery 208. As multiple convex portions may be contemplated, said multiple convex portions 220 may be arrayed around the second axis 206. In the present embodiment, two convex portions 220 are diametrically oppositely defined at the inner periphery 208 of the second coupler 162.

In an assembly of the second coupler 162 (coupled with the milling drum 122) to the first coupler 160 (coupled with the driveshaft 124), the mating surface 202 of the second coupler 162 is configured to be slidably received into the engagement surface 166 of the first coupler 160 along the drive axis 154. Such receipt of the mating surface 202 enables the second coupler 162 to engage with the first coupler 160 about the drive axis 154 and transfer torque from the driveshaft 124 to the milling drum 122.

The retention member 128 may be configured to prevent disengagement (e.g., axially along the drive axis 154) of the engagement surface 166 of the first coupler 160 from the mating surface 202 of the second coupler 162. The retention member 128 may be any element or apparatus that serves to retain the milling drum 122 with the driveshaft 124 along the drive axis 154, and is not limited to the configuration disclosed or discussed in the present disclosure.

Figure 5:
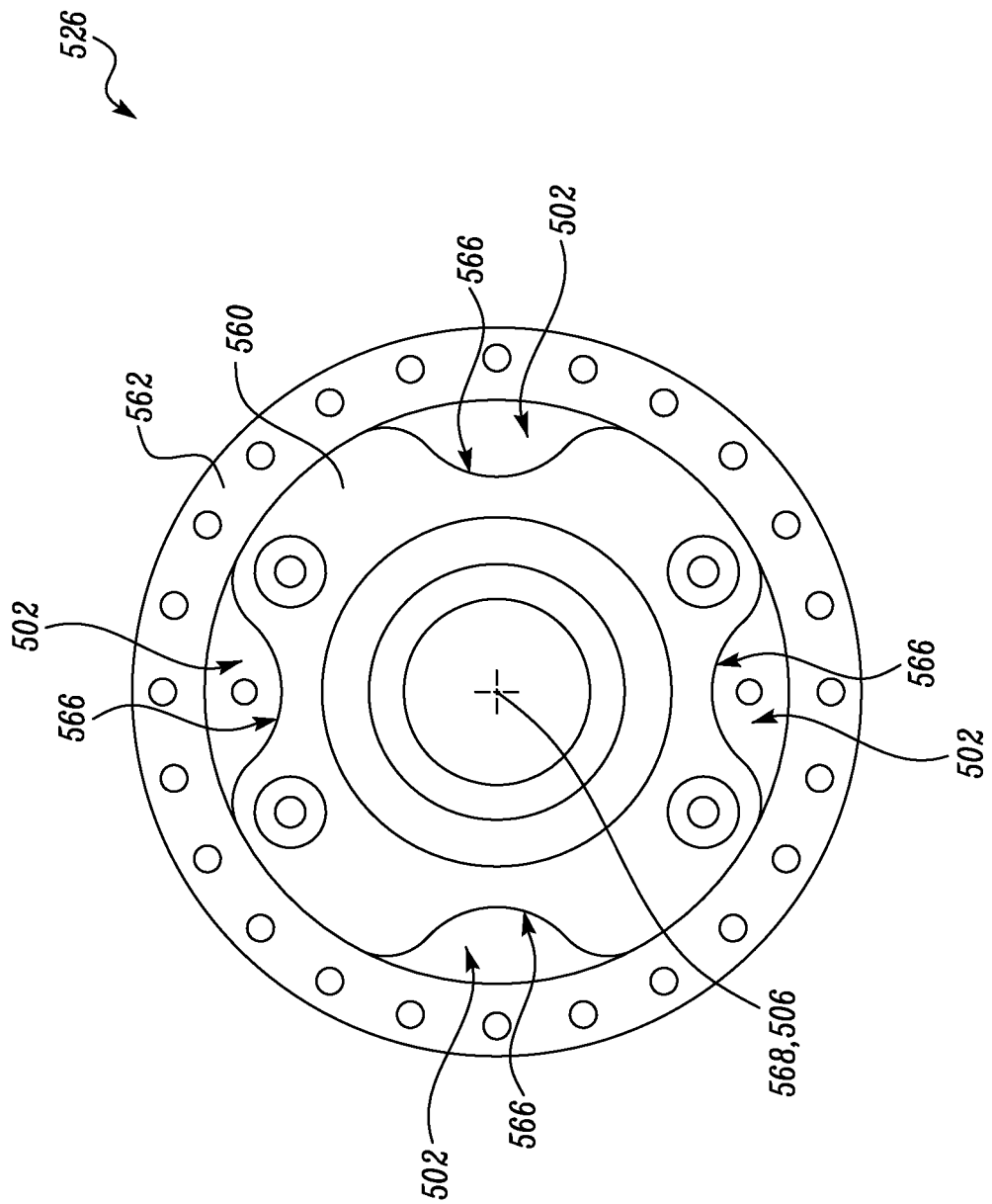
FIG. 5 is a front view of the system, in accordance with another embodiment of the present disclosure.

Referring to FIG. 5, a system 526 similar to the system 126 is shown. As shown in FIG. 5, the system 526 includes a first coupler 560 having four engagement surfaces 566 similar to the engagement surface 166 of the first coupler 160 of the system 126. The four engagement surfaces 566 are equidistantly spaced and/or rotationally arrayed around a first axis 568 of the first coupler 560. Also, the system 526 includes a second coupler 562 having four mating surfaces 502 similar to the mating surface 202 of the second coupler 162 of the system 126. The four mating surfaces 502 are equidistantly spaced and/or rotationally arrayed around a second axis 506 of the second coupler 562. In an engagement of the second coupler 562 to the first coupler 560, the four mating surfaces 502 of the second coupler 562 are configured to be slidably received into the corresponding four engagement surfaces 566 of the first coupler 560 along the drive axis 154. Such receipt of the mating surfaces 502 enable the second coupler 562 to engage with the first coupler 560, and when the first coupler 560 is assembled to the driveshaft 124 and the second coupler 562 is assembled to the milling drum 122, said system 526 may facilitate transfer of torque from the driveshaft 124 to the milling drum 122.

Figure 6:
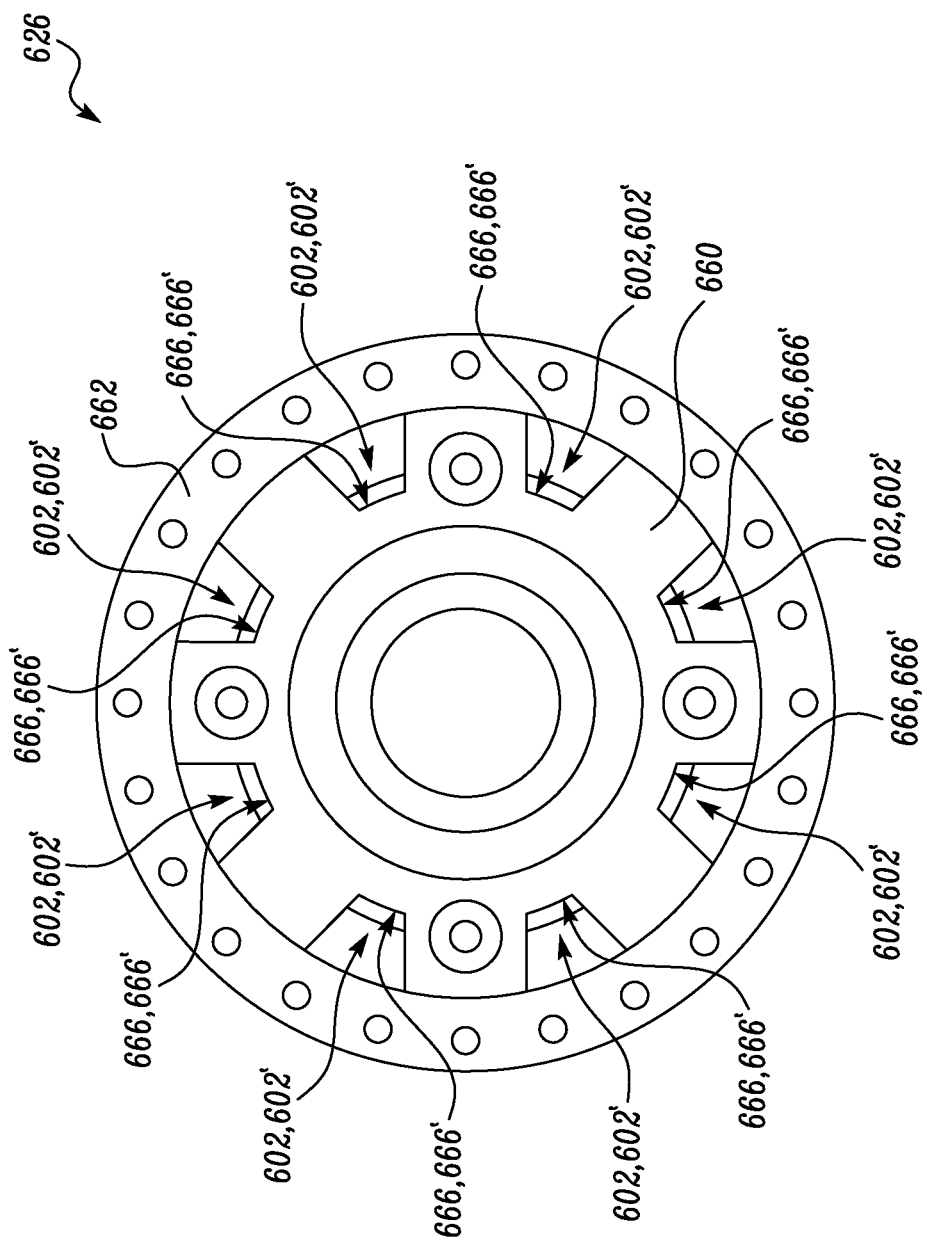
FIG. 6 is a front view of the system, in accordance with yet another embodiment of the present disclosure.

Referring to FIG. 6, a system 626 is disclosed. The system 626 may be similar in many respects to the system 126 but may differ from the system 126 in that the system 626 includes a first coupler 660 having multiple trapezoidal-shaped engagement surfaces 666 (e.g., trapezoidal-shaped notches 666') and a second coupler 662 having multiple trapezoidal-shaped mating surfaces 602 (e.g., trapezoidal-shaped protuberances 602') that may be correspondingly received into the trapezoidal-shaped engagement surfaces 666, 666'. Such receipt of the mating surfaces 602 enable the second coupler 662 to engage with the first coupler 660, and when the first coupler 660 is assembled to the driveshaft 124 and the second coupler 662 is assembled to the milling drum 122, said system 626 may facilitate transfer of torque from the driveshaft 124 to the milling drum 122.

A configuration (e.g., shape, size, and number) of the engagement surface 166, 566, 666, and the mating surface 202, 502, 602, as described in the present disclosure may be considered to be exemplary. Those of skill in the art may contemplate one or more variations in said configuration without any deviation from the claimed subject matter.

INDUSTRIAL APPLICABILITY

During a work cycle or before the start of a new work cycle, there may be a need to change the milling drum 122 with a different milling drum—e.g., to bring about a variation in one or more characteristics (e.g., a depth of milling) of the ground surface 104 (or roadway 106). To replace a used or existing milling drum (e.g., milling drum 122) with a different or a new milling drum, the operators and/or site supervisors may first move the machine 100 to a service spot and bring the machine 100 to a halt. Thereafter, the operators/supervisors may open the milling chamber 120 so as to access the enclosure 130 in which the milling drum 122 is positioned.

Once access to the enclosure 130 is established, the operators/supervisors may move the retention member 128 to disengage the engagement surface 166, 566, 666 of the first coupler 160, 560, 660 and the mating surface 202, 502, 602 of the second coupler 162, 562, 662, thereby facilitating the release of the milling drum 122 from the driveshaft 124 along the drive axis 154. Next, the operators/supervisors may reach out to the milling drum 122 and may pull, release, and separate away the milling drum 122 (with the second coupler 162, 562, 662, coupled thereto) from the driveshaft 124 along the drive axis 154.

The operators/supervisors may then bring forth the new milling drum coupled with a new second coupler (similar to the second coupler 162, 562, 662). It may be assumed that the new second coupler may include similar features (e.g., mating surface 202, 502, 602) as of the old second coupler (i.e., second coupler 162, 562, 662). The new milling drum, coupled with the new second coupler, may then be brought in for assembly with the driveshaft 124. To do so, the new milling drum may be slid and mounted atop the driveshaft 124 and pushed along the drive axis 154 of the driveshaft 124 such that a hollow space defined within the new milling drum may receive the driveshaft 124 therein. In process, a mating surface of the new second coupler may also engage with the engagement surface 166, 566, 666 of the first coupler 160, 560, 660 (coupled to the axial end 156 of the driveshaft 124). Further, an end of the new milling drum may abut an end collar 300 (see FIG. 3) of the driveshaft 124 so as to restrict any further axial movement (i.e., a movement along the drive axis 154) of the new milling drum with respect to the driveshaft 124 in the pushing direction.

With the mating surface of the new second coupler (coupled to the new milling drum) engaged with the engagement surface 166, 566, 666 of the first coupler 160, 560, 660, the new milling drum may be restricted to move (e.g., rotate) relative to the driveshaft 124 about the drive axis 154. In so doing, the driveshaft 124 and the new milling drum may be driven (e.g., rotatably driven) together or in unison about the drive axis 154, during the work cycle. Further, to restrict the movement of the new milling drum along the drive axis 154, the operators/supervisors may return the retention member 128 to a position in which the retention member 128 may restrict the disengagement between the engagement surface 166, 566, 666 of the first coupler 160, 560, 660 and the mating surface of the new second coupler, thereby inhibiting a release of the new milling drum from the driveshaft 124 along the drive axis 154

In case the first coupler 160, 560, 660 is damaged or worn out after extended use, the same may be easily replaced with a new first coupler. For instance, the operators/supervisors may reach out to the first coupler 160, 560, 660 (after disassembling the milling drum 122 along with the second coupler 162, 562, 662 from the driveshaft 124, as discussed above) and unfasten and remove the first fasteners 178 from the first coupler 160, 560, 660 so as to decouple the first coupler 160, 560, 660 from the driveshaft 124. Next, the operators/supervisors may couple a new first coupler (similar to the first coupler 160, 560, 660) with the driveshaft 124. To do so, the operators/supervisors may abut a second end surface of the new first coupler against the axial end 156 of the driveshaft 124 such that through-bores of the new first coupler are aligned with their corresponding mounting bores 158 (present on the axial end 156 of the driveshaft 124). Also, the operators/supervisors may then use the first fasteners 178 to couple the new first coupler with the driveshaft 124.

In case the second coupler 162, 562, 662 is damaged or worn out after extended use, the same may be easily replaced with a new second coupler. For instance, the operators/supervisors may reach out to the second coupler 162, 562, 662 (after disassembling the milling drum 122 along with the second coupler 162, 562, 662 from the driveshaft 124, as discussed above) and unfasten and remove the second fasteners 218 from the second coupler 162, 562, 662 so as to decouple the second coupler 162, 562, 662 from the internal surface 142 (e.g., from the flange face 146 of the flange portion 144) of the milling drum 122. In that manner, the second coupler 162, 562, 662 may be altogether removed from the milling drum 122. Next, the operators/supervisors may couple a new second coupler (similar to the second coupler 162, 562, 662) with the milling drum 122. To do so, the operators/supervisors may abut a second side surface of the new second coupler against the internal surface 142 of the milling drum 122 such that through-holes of the new second coupler are aligned with their corresponding mounting-holes 148 (present on the flange face 146 of the milling drum 122). Also, the operators/supervisors may then use the second fasteners 218 to couple the new second coupler with the internal surface 142 of the milling drum 122.

The system 126, 526, 626 offers the operators/supervisors the flexibility to easily, efficiently, and reliably, assemble and disassemble various milling drums (e.g., milling drum 122) multiple times onto the driveshaft 124, as and when needed. Moreover, if a damage to the first coupler 160, 560, 660 and/or to the second coupler 162, 562, 662 were to occur, it is easier and more cost effective to solely replace the first coupler 160, 560, 660 and/or the second coupler 162, 562, 662 than to have the milling drum 122 and/or the driveshaft 124 replaced. The system 126, 526, 626 also makes the disassembly/assembly process for a milling drum changeout easier, less time consuming, and less tedious, in turn enhancing operational comfort, productivity, and work efficiency.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system for transferring torque from a driveshaft to a milling drum mountable on the driveshaft, the system comprising:
a first coupler abutting and removably coupled to the driveshaft with first fasteners to co-rotate with the driveshaft, the first coupler defining an engagement surface; and
a second coupler abutting and removably coupled to the milling drum with second fasteners, the second coupler defining a mating surface engageable with the engagement surface of the first coupler to engage the second coupler to the first coupler and transfer torque from the driveshaft to the milling drum, wherein a portion of the second coupler is disposed radially outward of the first coupler.

2. The system of claim 1, wherein the first coupler includes a disc shaped body defining a first axis, the driveshaft defining a drive axis, the first axis configured to coincide with the drive axis.

3. The system of claim 1, wherein the driveshaft includes an axial end, the first coupler including a plurality of through-bores for receiving the first fasteners to removably couple the first coupler to the axial end.

4. The system of claim 1, wherein the second coupler includes a plurality of through-holes for receiving the second fasteners to removably couple the second coupler to an internal surface of the milling drum.

5. The system of claim 1, wherein the first coupler includes a disc shaped body defining a first axis and an outer periphery, the engagement surface being defined by one or more concave portions extending from the outer periphery into the disc shaped body.

6. The system of claim 5, wherein the one or more concave portions are arrayed around the first axis.

7. The system of claim 1, wherein the second coupler includes an annular body defining a second axis, an aperture and an inner periphery extending around the aperture, the mating surface being defined by one or more convex portions extending into the aperture from the inner periphery.

8. The system of claim 7, wherein the one or more convex portions are arrayed around the second axis.

9. A milling assembly for a milling machine, the milling assembly comprising:
a driveshaft;
a milling drum mountable on the driveshaft; and
a system for transferring torque from the driveshaft to the milling drum, the system including:
a first coupler removably coupled to the driveshaft to co-rotate with the driveshaft, the first coupler defining;
a first axis aligned with a drive axis of the driveshaft;
a disc shaped surface having a first plurality of through-bores; and
an engagement surface at a radially outer periphery of the first coupler, the engagement surface having a concave portion extending into the disc shaped surface; and
a second coupler removably coupled to the milling drum, the second coupler defining a mating surface engageable with the engagement surface of the first coupler to engage the second coupler to the first coupler and transfer torque from the driveshaft to the milling drum.

10. The milling assembly of claim 9, wherein the driveshaft includes an axial end and a plurality of first fasteners removably couple the first coupler to the axial end.

11. The milling assembly of claim 9, wherein the second coupler includes a second plurality of through-holes for receiving a plurality of second fasteners to removably couple the second coupler to an internal surface of the milling drum.

12. The milling assembly of claim 9, wherein the second coupler includes an annular body defining a second axis, an aperture and an inner periphery extending around the aperture, the mating surface being defined by one or more convex portions extending into the aperture from the inner periphery, the one or more convex portions are arrayed around the second axis.

13. The milling assembly of claim 9, wherein the second coupler is aligned with the drive axis of the driveshaft.

14. A milling machine comprising:
a frame;
a milling assembly supported by the frame, the milling assembly including:
a driveshaft;
a milling drum mountable on the driveshaft; and
a system for transferring torque from the driveshaft to the milling drum, the system including:
a first coupler removably coupled to the driveshaft with first fasteners to co-rotate with the driveshaft, the first coupler defining an outer periphery and an engagement surface; and
a second coupler removably coupled to the milling drum with second fasteners, the second coupler defining a mating surface engageable with the engagement surface of the first coupler to engage the second coupler to the first coupler and transfer torque from the driveshaft to the milling drum, wherein a portion of the second coupler is disposed radially outward of the outer periphery of the first coupler.

15. The milling machine of claim 14, wherein the first coupler includes a disc shaped body defining a first axis, the driveshaft defining a drive axis, the first axis configured to coincide with the drive axis.

16. The milling machine of claim 14, wherein the driveshaft includes an axial end, the first coupler including a plurality of through-bores for receiving the first fasteners to removably couple the first coupler to the axial end.

17. The milling machine of claim 14, wherein the second coupler includes a plurality of through-holes for receiving the second fasteners to removably couple the second coupler to an internal surface of the milling drum.

18. The milling machine of claim 14, wherein the first coupler includes a disc shaped body defining a first axis and the outer periphery, the engagement surface being defined by one or more concave portions extending from the outer periphery into the disc shaped body, the one or more concave portions are arrayed around the first axis.

19. The milling machine of claim 14, wherein the second coupler includes an annular body defining a second axis, an aperture and an inner periphery extending around the aperture, the mating surface being defined by one or more convex portions extending into the aperture from the inner periphery, the one or more convex portions are arrayed around the second axis.

20. The milling machine of claim 14, wherein the second coupler abuts the milling drum.

\* \* \* \* \*